UNITED STATES PATENT OFFICE.

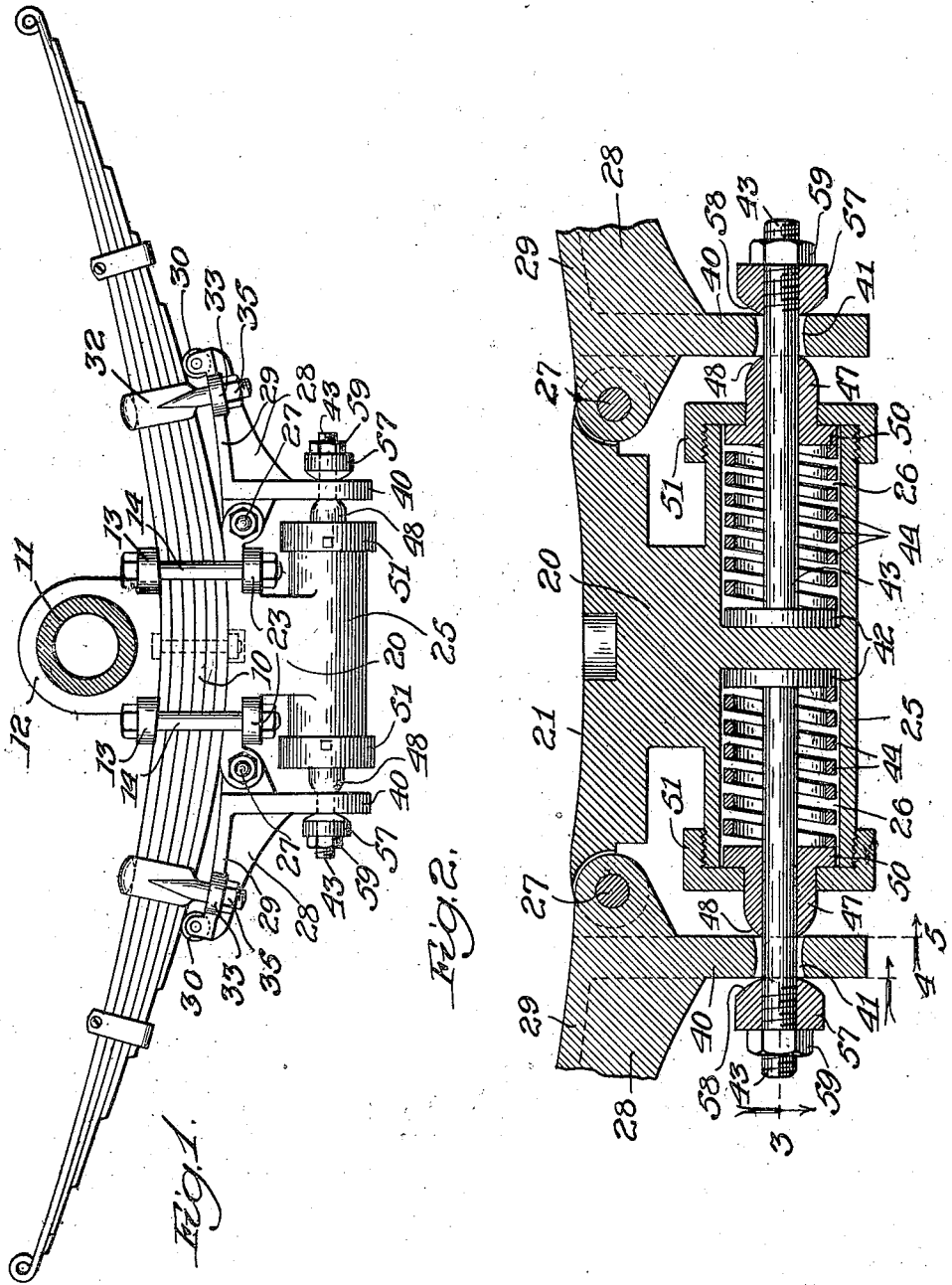

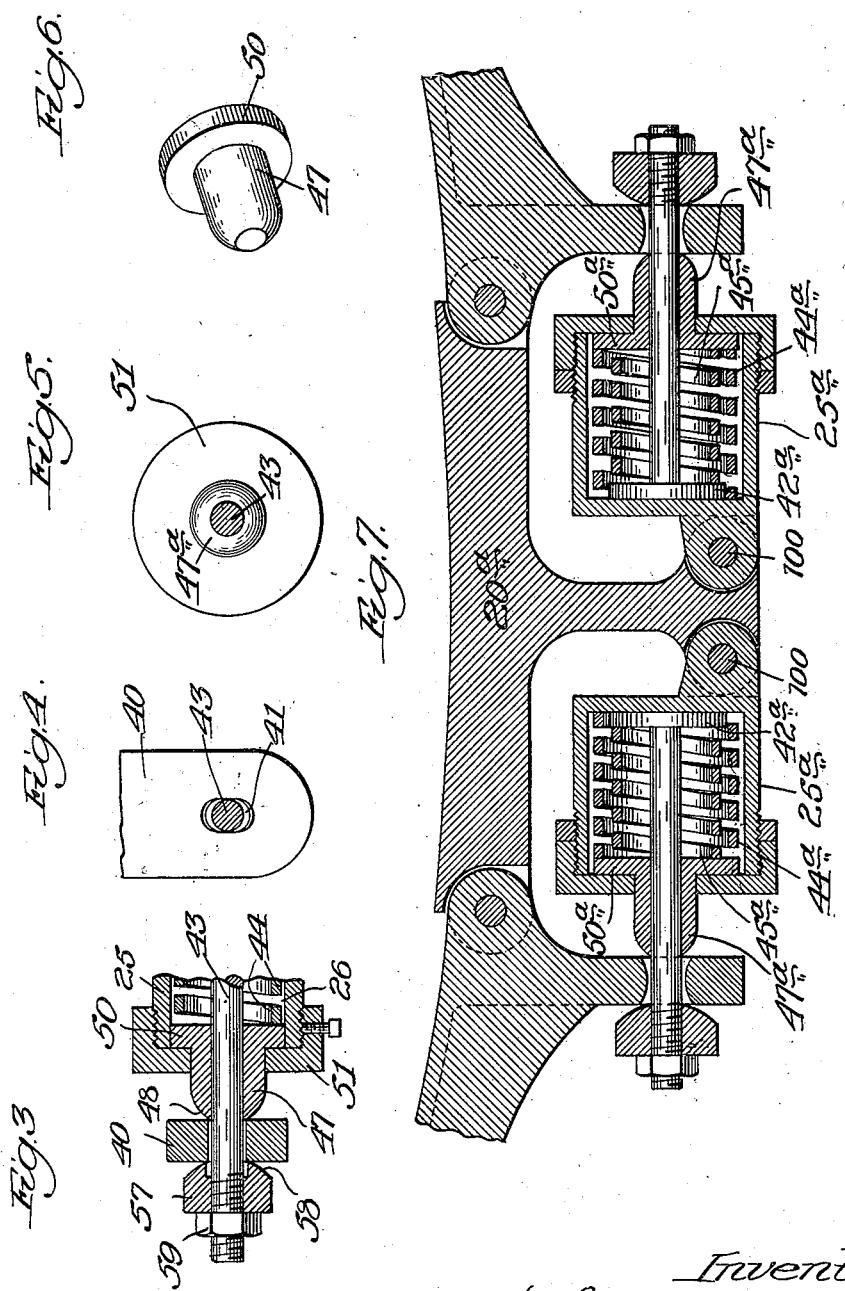

WILLIAM T. SCHRUM, OF HAMMOND, INDIANA, AND EDWARD KRANTZ, OF CHICAGO, ILLINOIS, ASSIGNORS, BY DIRECT AND MESNE ASSIGNMENTS, TO SCHRUM MANUFACTURING CO., OF CHICAGO, ILLINOIS, A CORPORATION OF ILLINOIS.

SHOCK ABSORBER.

1,426,013.    Specification of Letters Patent.    Patented Aug. 15, 1922.

Application filed May 16, 1921. Serial No. 469,843.

*To all whom it may concern:*

Be it known that we, WILLIAM T. SCHRUM, a citizen of the United States, residing at Hammond, in the county of Lake and State of Indiana, and EDWARD KRANTZ, a citizen of the United States, residing at 718 Waveland Avenue, Chicago, Illinois, in the county of Cook, and State of Illinois, have invented a new and useful Improvement in Shock Absorbers, of which the following is a specification.

This invention relates to shock absorbers and more especially to a shock absorber adapted to be used in connection with a vehicle spring such as is commonly used on motor vehicles.

In that form of device embodying the features of our invention, shown in the accompanying drawings Figure 1 is a view in side elevation of the shock absorber, Fig. 2 is a vertical sectional view of the device shown in Fig. 1, Fig. 3 is a view taken as indicated by the line 3 of Fig. 2, Fig. 4 is a view taken as indicated by the line 4 of Fig. 2, Fig. 5 is a view taken as indicated by the line 5 of Fig. 2, Fig. 6 is a view in perspective of a part of the device and Fig. 7 is a vertical sectional view of a modified form of the device.

As shown in the drawings, 10 indicates in general a semi-elliptical leaf spring which may be of any ordinary type. 11 indicates a tubular axle or axle-housing on the ends of which are mounted the wheels of the vehicle in any well known manner. As shown in the drawings, the axle 11 is supported above the spring; but it is obvious that, without detracting from the spirit of this invention, and with but slight modifications, the axle may be supported below the spring. As shown, the axle 11 is surrounded by a casting 12 having four projecting lugs or ears 13, two projecting out beyond the spring 10. The ears 13 are suitably drilled for bolts 14, two of which depend downwardly on each side of the spring.

The shock absorber is arranged below the spring 10 and comprises a casting 20 having a smooth slightly concaved upper surface 21 adapted to bear against the under surface of the spring 10. The casting 20 is provided with ears or lugs 23 corresponding to the ears 13, suitably drilled and adapted to receive the ends of the bolts 14 which are held in place by suitable nuts. It will be noted that by this construction, the spring 10 is firmly clamped between the axle and the casting 20 and the parts are held in firm engagement, so that the axle 11 is suitably supported by the spring 10 from the ends thereof.

The lower part of the casting 20 is cylindrical in form as indicated by 25. The ends of the cylindrical part 25 are bored out or cored as indicated by 26. Pivotally mounted as at 27, on the ends of the upper part of the casting 20 are two bell cranks 28. The horizontal arms 29 of the bell cranks 28 extend horizontally substantially parallel to and below the spring 10 and are provided on their outer ends with rollers 30 adapted to bear against the under side of the lowest spring leaf. Each roller 30 is held in contact with the spring leaf by a U shaped clip 32, extending over the spring 10 and having its ends threaded and fastened by nuts 35 to ears or lugs 33 extending out side ways from the arm 29. The vertical arms 40 of the bell cranks 28 depend downwardly and are provided with vertical slots 41. Fitted in each of the bores 26 is a piston 42 provided with a piston rod 43 extending outwardly beyond the end of the cylindrical part 25 and projecting through the slot 41 in the arm 40 of the bell crank 28. Surrounding the piston rod 43 and lying within the bore 26 is a spiral spring 44. Slidably mounted on the piston rod 43 is a sleeve 47 having its outer end extending out beyond the end of the cylindrical part 25, rounded as indicated by 48 and adapted to bear against the arm 40 of the bell crank 28. The other, or inner end of the sleeve 47 is provided with a flange 50, forming a piston in the bore 26, adapted to bear against the outer end of the spring 44. One of the sleeves 47 with its flange 50 is shown in perspective in Fig. 6. Each of the bolts 26 is also provided with a cap 51 screwed on to the end of the cylindrical part 25 and provided with a circular opening of sufficient size to permit the sleeve 47 to extend therethrough. Each of the piston rods 43 has screwed on its outer end a nut 57 with its inner face rounded as indicated by 58, and adapted to bear against the outer side of the arm 40 of the bell crank 28. A suitable lock nut 59 is provided for each of the nuts 57.

In the operation of the device, upward movement of the axle 11 causes the bending of the spring 10, or relative downward movement of its ends. This relative downward movement of the ends of the spring 10 causes downward movement of the rollers 30, which causes the arms 40 of the bell cranks to move toward each other. This movement of the arms 40 toward each other causes inward movement of the sleeves 47 and consequent compression of the springs 44 by flanges 50. Downward movement of the axle 11, on the contrary, pulls the arms 29 of the bell cranks 28 upwardly by means of the clips 32, which causes the arms 40 to move away from each other. This movement of the arms 40 away from each other, operates against the nuts 57 on the piston rods 43 to move the pistons 42 outwardly and away from each other and consequently compress the springs 44. It will be seen that by this construction both upward and downward movement of the axle 11 and consequent bending of the spring 10, operates to compress the springs 44. The sleeves 47 may be made any desired length and likewise the nuts 57 may be set in any position desired in order to give the desired adjustment.

In Fig. 7 is shown a modified form of the device. In this form of device the casting 20ª corresponds to and is similar to the casting 20 in the preferred form. Instead of having a cylindrical part 25, however, it is provided with two cylinders 25ª in which are mounted the pistons 42ª in a similar manner to the pistons 42 in the preferred form. The cylinders 25ª instead of being made integral with the casting 20ª as in the preferred form, are separately formed and pivoted to the casting as indicated by 100. The pivots 100 permit slight rocking movement of the cylinders 25ª. Instead of using one spring in each of the cylinders, as in the preferred form, the modified form has mounted in each of the cylinders 25ª, two concentrically arranged springs, the outer being indicated by 44ª and the inner by 45ª. The piston 42ª is made somewhat smaller than the piston 42, so that it will engage only the end of the inner spring 45ª and will move inside of the spring 44ª without compressing the same. The flange 50ª on the sleeve 47ª, corresponding to the flange 50 in the preferred form, is made large enough, however, to engage the ends of both springs. Except for the modifications noted, the operation of the modified form is substantially the same as the operation of the preferred form. It will be noted, however, that the inward movement of the flanges 50ª will compress both springs, while outward movement of the pistons 42ª will compress only the inner springs. By this construction there will be more spring resistance to upward movement of the axle 11 than to its downward movement.

While we have shown and described certain embodiments of our invention, it is to be understood that it is capable of many modifications. Changes therefore in the construction and arrangement may be made without departing from the spirit and scope of the invention as disclosed in the appended claims, in which it is our intention to claim all novelty inherent in our invention as broadly as possible in view of the prior art.

What we claim:

1. In combination with a leaf spring, a shock absorber comprising a spring support at the center of the spring, a bell crank pivotally mounted on the spring support with the end of one of its arms bearing against the leaf spring to one side of the center and resilient means for cushioning movement of the other arm of said bell crank.

2. In combination with a leaf spring, a shock absorber comprising a spring support at the center of the spring, a bell crank pivotally mounted on the spring support with the end of one of its arms bearing against the convex surface of the leaf spring to one side of the center and resilient means for cushioning movement of the other arm of said bell crank.

3. In combination with a leaf spring, a shock absorber comprising a spring support having a bell crank pivotally mounted thereon, the end of one arm of said bell crank bearing against the leaf spring and resilient means for cushioning movement of the other arm, said resilient means comprising a spiral spring arranged in a bore in the spring support.

4. In combination with a leaf spring, a shock absorber comprising a spring support having a bell crank pivotally mounted thereon, the end of one arm of said bell crank bearing against the convex surface of the leaf spring and resilient means for cushioning movement of the other arm, said resilient means comprising a spiral spring arranged in a bore in the spring support.

5. In combination with a leaf spring, a shock absorber comprising a spring support at the center of the spring, a bell crank pivotally mounted on the spring support with the end of one of its arms bearing against the leaf spring to one side of the center and resilient means for cushioning movement of the other arm of said bell crank, said resilient means comprising a spiral spring arranged in a bore in the spring support.

6. In combination with a leaf spring, a shock absorber comprising a spring support at the center of the spring, a bell crank pivotally mounted on the spring support with the end of one of its arms bearing against the convex surface of the leaf spring to one side of the center and resilient means for cushioning movement of the other arm of said bell crank, said resilient means comprising a spiral spring arranged in a bore in the spring support.

7. In combination with a leaf spring, a shock absorber comprising a spring support having a bell crank pivotally mounted thereon, the end of one arm of said bell crank being in sliding engagement with the convex surface of the leaf spring and resilient means for cushioning movement of the other arm.

8. In combination with a semi-elliptical leaf spring, a shock absorber comprising a spring support having a bell crank pivotally mounted thereon, the end of one arm of said bell crank being in sliding engagement with the convex surface of the semi-elliptical leaf spring and resilient means for cushioning movement of the other arm.

9. In a device of the character described, a spring support, a leaf spring rigidly mounted on the spring support, and a bell crank pivotally mounted on the spring support, the end of one arm of said bell crank bearing against the leaf spring and resilient means for cushioning movement of the other arm.

10. In a device of the character described, a spring support, a leaf spring rigidly mounted on the spring support, and a bell crank pivotally mounted on the spring support, the end of one arm of said bell crank bearing against the convex surface of the leaf spring and resilient means for cushioning movement of the other arm.

In witness whereof we have hereunto set our hands and seals this 13 day of May 1921.

WILLIAM T. SCHRUM. [L. S.]
EDWARD KRANTZ. [L. S.]